UNITED STATES PATENT OFFICE.

PHILIP L. SYLVESTER, OF AUBURN, NEW YORK, ASSIGNOR TO WOODRUFF BROTHERS, OF SAME PLACE.

MANUFACTURE OF BUTTONS FROM PLASTIC MATERIAL.

SPECIFICATION forming part of Letters Patent No. 232,566, dated September 21, 1880.

Application filed May 8, 1880. (No model.)

*To all whom it may concern:*

Be it known that I, PHILIP L. SYLVESTER, of Auburn, in the county of Cayuga, and in the State of New York, have invented certain new and useful Improvements in the Manufacture of Buttons from Plastic Material, (Case A;) and I do hereby declare that the following is a full, clear, and exact description thereof.

The design of my invention is to improve the quality and to lessen the expense of preparing plastic material for use in molding buttons; and to this end it consists in an improved method of combining the ingredients, whereby a homogeneous mass is secured, substantially as and for the purpose hereinafter specified.

In the preparation of plastic material I place the ingredients employed, in a powdered state, within a barrel or other like receptacle, and after closing the same cause it to revolve upon pivotal bearings, so as to roll its contents over and over, the duration of such motion being governed by the number of ingredients and the quantity of the same contained within said barrel. After the barrel has been rotated as long as experience dictates its contents will be found to have become so perfectly mixed together as to form a mass that is homogeneous, and presents an even temper and color, which mass is then ready to be made plastic by passage through heated rollers in the usual manner, preparatory to being placed within the button-molds.

Heretofore it has been the custom to place the powdered ingredients within a box and stir the same by means of a stick or by the hand of the operator; but such operation was very imperfect in result, the mixture being uneven in temper and color, and required several times the time required for the perfect mixing together of a given quantity of material by my method. It will thus be seen that by use of my method two important results are secured—viz., the production of a better article and a decrease in the cost of preparing the same.

Having thus fully set forth the nature and merits of my invention, what I claim as new is—

An improved method of preparing plastic material for the manufacture of buttons by placing the powdered ingredients within a pivoted receptacle and causing the same to revolve so as to mix said ingredients together, and then passing the mixture through heated rollers, substantially as specified.

In testimony that I claim the foregoing I have hereunto set my hand this 5th day of May, 1880.

P. L. SYLVESTER.

Witnesses:
P. C. WOODRUFF,
H. WOODRUFF.